United States Patent [19]
Oohashi et al.

[11] Patent Number: 5,164,029
[45] Date of Patent: Nov. 17, 1992

[54] RADIAL TIRE FOR HIGH LOAD WITH EXCELLENT VIBRATION DAMPING PERFORMANCE

[75] Inventors: Susumu Oohashi, Aichi; Takashi Nishimura, Hyogo, both of Japan

[73] Assignee: Sumitomo Rubber Industries, Ltd., Hyogo, Japan

[21] Appl. No.: 668,377

[22] PCT Filed: Apr. 9, 1987

[86] PCT No.: PCT/JP87/00223
  § 371 Date: Oct. 11, 1988
  § 102(e) Date: Oct. 11, 1988

[87] PCT Pub. No.: WO87/06199
  PCT Pub. Date: Oct. 22, 1987

Related U.S. Application Data

[63] Continuation of Ser. No. 249,172, Oct. 11, 1988, abandoned.

[30] Foreign Application Priority Data

Apr. 9, 1986 [JP] Japan .............................. 61-53968[U]

[51] Int. Cl.$^5$ .......................... B60C 19/00; B60C 15/06
[52] U.S. Cl. ...................................... 152/546; 152/547; 152/555
[58] Field of Search ................. 152/551, 555, 552, 561, 152/546, 523, 524, 550, 517, 547

[56] References Cited

U.S. PATENT DOCUMENTS

| | | | |
|---|---|---|---|
| 3,058,509 | 10/1962 | Maiocchi | 152/555 X |
| 3,481,386 | 12/1969 | Menell et al. | 152/555 |
| 3,509,930 | 5/1970 | Mirtain | 152/555 |
| 3,703,203 | 11/1972 | Simpson | 152/555 X |
| 4,046,183 | 9/1977 | Takahashi et al. | 152/555 |
| 4,067,372 | 1/1978 | Masson | 152/555 X |
| 4,096,899 | 6/1978 | Kitazawa et al. | 152/555 |
| 4,185,675 | 1/1980 | Greiner et al. | 152/555 X |
| 4,287,929 | 9/1981 | Huinink | 152/555 |
| 4,295,511 | 10/1981 | Mezzanotte et al. | 152/555 |
| 4,436,130 | 3/1984 | Suzuki et al. | 152/556 |
| 4,438,796 | 3/1984 | Abe et al. | 152/555 |
| 4,744,400 | 5/1988 | Sekoguchi | 152/555 |
| 4,917,166 | 4/1990 | Iuchi | 152/546 |
| 4,953,605 | 9/1990 | Kawamura et al. | 152/546 X |
| 5,080,158 | 1/1992 | Kawamura | 152/546 X |

FOREIGN PATENT DOCUMENTS 2340310 2/1975 Fed. Rep. of Germany ...... 152/555

Primary Examiner—Michael W. Ball
Assistant Examiner—Adrienne C. Johnstone
Attorney, Agent, or Firm—Birch, Stewart, Kolasch & Birch

[57] ABSTRACT

A radial tire for high load which possesses excellent vibration damping performance, wherein a carcass cord reinforcing layer composed of fiber cords laid at a bias angle of between 30 and 90 degrees with respect to the radial direction of the tire is arranged adjacent to a carcass ply of a radial arrangement so that both edges thereof in the radial direction overlap with a belt and a bead reinforcing layer respectively by a certain amount.

2 Claims, 3 Drawing Sheets

RADIAL TIRE FOR HIGH LOAD WITH EXCELLENT VIBRATION DAMPING PERFORMANCE

This application is a continuation, of application Ser. No. 07/249,172 filed on Oct. 11, 1988, now abandoned.

FIELD OF ART

The present invention relates to a radial tire for high load which is suitable for material handling in industrial vehicles and in construction vehicles, wherein driving stability and vibration damping performance are improved.

BACKGROUND ART

Hitherto, there has been used the so called bias tire as a tire for high loads such as tires for industrial vehicles, construction vehicles and the like, but recently, a radial tire in which steel cords are embedded in its carcass is most popular because it excels in ride comfort and wear resistance.

However, such radial tire has a low vertical spring coefficient. Therefore, especially when it is applied to forklifts which have many opportunities for turning, starting and stopping, rolling and pitching of the vehicle tend to occur. Also at the time of driving, when the tires run over projections or obstacles on the road, it gives the vehicle body unstable rolling properties. This becomes a problem, if steel radial tires with conventional structure are used on industrial vehicles, such as the forklifts or high place working vehicles, because they become a factor in the vibration of the mast or the crane thereof, whereas if applied to the passenger cars this presents no problem.

Ways of reinforcing the carcass of the radial tire have been studied, particularly the portions in the tire sidewalls which are largely bent, and the matters by which the vibration damping performance is improved has been investigated, throughly, thereby arriving at the completion of the present invention.

DISCLOSURE OF INVENTION

The present invention relates to a radial tire for high load which is characterized by: a carcass in which steel cords are laid at an angle of 70 to 90 degrees to the circumferential direction of the tire and in which both edges are folded back around bead cores and secured thereto; a belt layer in which steel cords are arranged outside the crown of the carcass at a small angle to the circumferential direction of the tire; bead apexes between the carcass and the folded portions thereof which extend toward the sidewalls of the tire each from the upper side of each bead core while gradually decreasing the thickness and carcass cord reinforcing layers adjacent the carcass along their radial width which extend to beads from both edge portions of the belt layer.

BRIEF DESCRIPTION OF DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
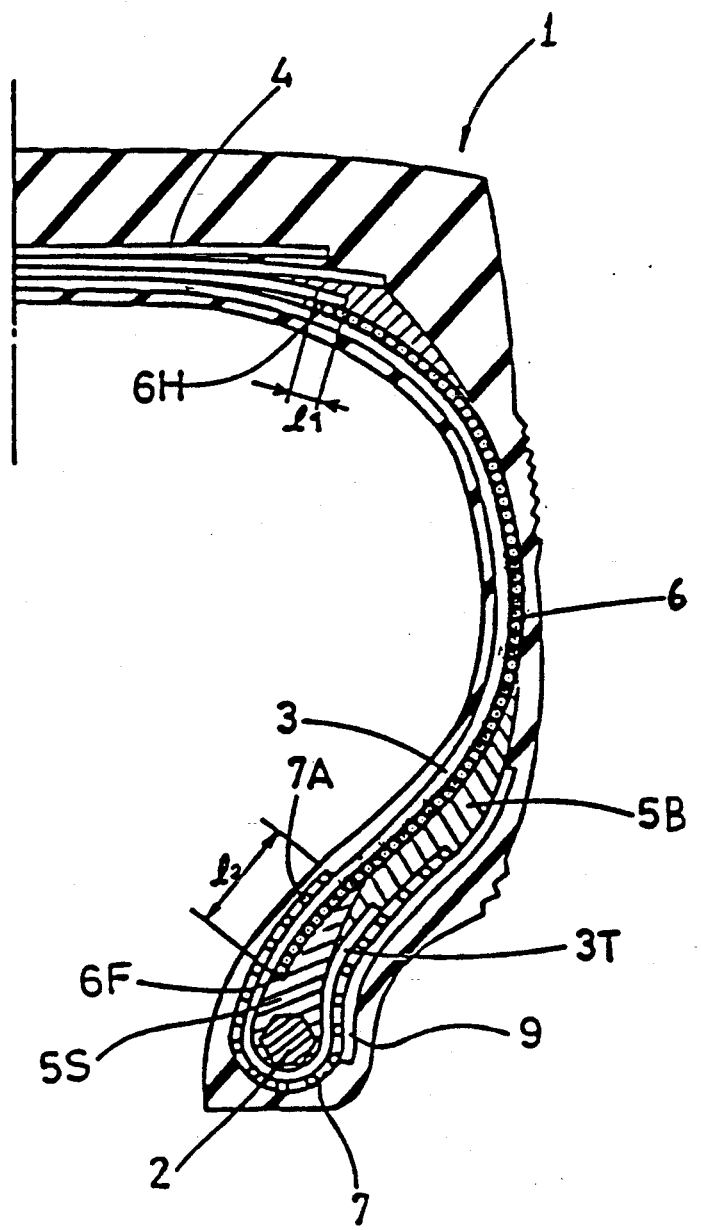
FIG. 1 shows the radial tire of the present invention wherein the carcass layer is shown radially inside of the carcass cord reinforcing layer.

In FIG. 1, the radial tire for high load 1 has a carcass 3 in which both edges are folded back around the bead cores 2 and secured thereto, a belt layer 4, containing belt plies 4A, 4B and 4C, bead apexes 5 and carcass cord reinforcing layers 6 disposed on the outside of the carcass which extends to the beads from both edge portions of the belt layer 4. Each bead is reinforced with a bead reinforcing layer 7, which is disposed on the outside (in this embodiment) of the carcass 3 so as to surround the bead core 2, and each carcass cord reinforcing layer 6 overlaps with the belt layer 4 and the bead reinforcing layer 7 in both edge portions thereof in the radial direction of the tire.

The carcass cord reinforcing layers 6 are provided for reinforcing the sidewalls of the tire, and, for that, high elastic cords such as aromatic polyamide fiber cords are preferably used, but organic fiber cords such as nylon, polyesters and/or rayons are also useable. The fiber cords are laid at a bias angle between 30 and 90 degrees to the radial direction of the tire, thereby increasing the lateral rigidity of the tire sidewalls while cooperating with the carcass 3 of which the cords are laid in the radial direction.

The upper edge 6H of the carcass cord reinforcing layer 6 is positioned under the edge portion of the belt layer 4 so as to partially overlap with the belt layer 4. The upper edges 6H are accordingly secured between the belt layer 4 and the carcass 3, as shown in the figure.

Figure 2:
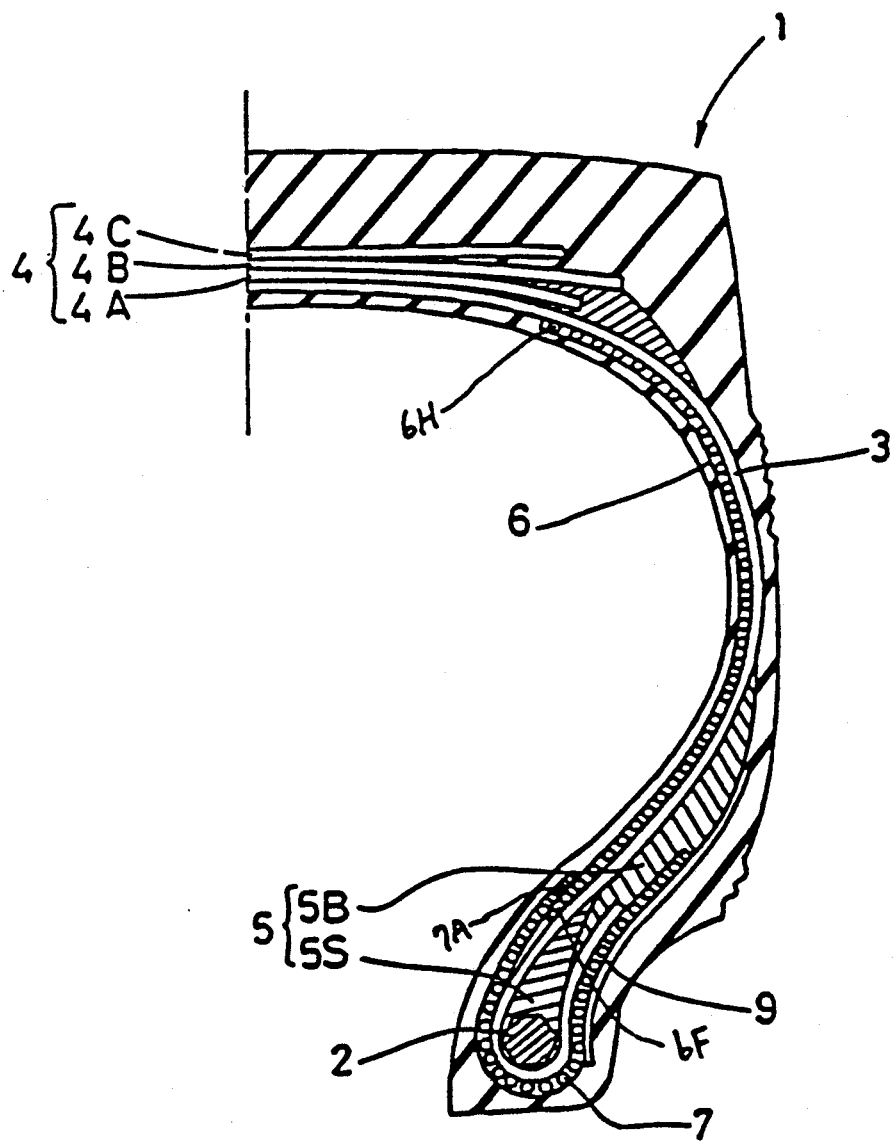
FIG. 2 shows the radial tire of the present invention wherein the carcass cord reinforcing layer is shown radially inside of the carcass layer.

As shown in FIG. 2, in the case where the carcass cord reinforcing layers 6 are disposed on the inside of the carcass 3, the lower edge 6F of the carcass cord reinforcing layer 6 is interposed between the bead reinforcing layer 7 and the carcass 3. The upper edge 6H indirectly overlaps with the belt layer 4.

Figure 3:
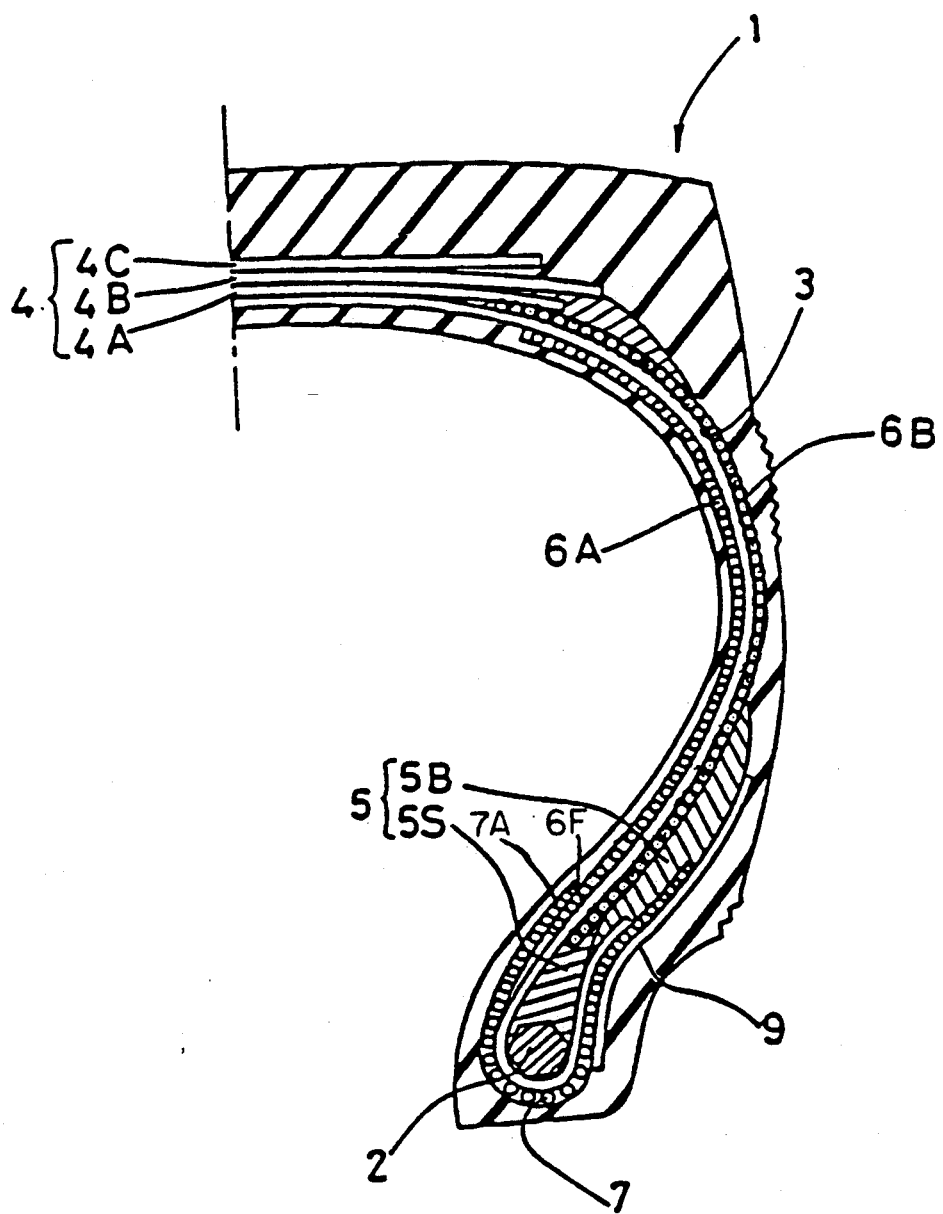
FIG. 3 shows the radial tire of the present invention wherein the carcass layer is disposed between carcass cord reinforcing layers.

In FIG. 3, the carcass cord reinforcing layers 6A and 6B are disposed on both the inside and the outside of the carcass 3.

The fact that the transmission of force from the tread to the tire sidewalls is improved by the carcass cords reinforcing layers 6, and the vibration dumping performance of the tire will be improved; and the fact that the sidewalls are reinforced with the carcass 3 of radial construction and the carcass reinforcing layer 6 of which the cords are arranged bias, and as the result, the vertical spring coefficient is increased and generation of the rolling and/or the pitching is reduced even if unbalance of loads between the left and right wheels may exist, are all obvious.

The lower edge 6F of the carcass cord reinforcing layer 6 is, as shown in the figures, terminated in a position above the bead core 2, axially inside the bead core 2, not on the folded portion (3T) side of the carcass ply 3 and overlaps with the folded part 7A of the bead reinforcing layer 7 indirectly with the carcass 3 being disposed there between (FIG. 1), without being secured around the bead core 2. The bead reinforcing layer 7 extends toward the sidewall beyond the folded portion 3T of the carcass 3, but, on the contrary, the folded portion 3T can be terminated in a position higher than the upper edge of the bead reinforcing layer 7.

By overlapping the lower edge part 6F of the carcass cord reinforcing layer 6 of the bias arrangement with the bead reinforcing layer 7, the tire load transmitted between the tire beads and the wheel is dispersed to a wider extent than conventional structures, not only in the radial direction but also in the circumferential direction of the tire and then the vibration damping performance is improved. Also the generation of rolling and pitching is reduced.

Preferably, the breadth $l_1$ of the overlap of the carcass cord reinforcing layer 6 with the belt layer 4 and the breadth $l_2$ of the overlap of the carcass cord reinforcing layer 6 with the bead reinforcing layer 7 are more than 5 mm. In this embodiment, they are 20 mm and 30 mm, respectively. If they are less than 5 mm, the load can not be transmitted smoothly and the vibration damping performance is not improved.

Under ordinary conditions, the carcass cord reinforcing layer 6 is preferably provided with only one ply of cords if the cords are aromatic polyamide fiber cords, but if the cords are nylon fiber cords or the like it is preferably provided with more than two plies, arranged crosswise.

In the present invention, the bead apexes 5 are disposed outside and adjacent to the above-mentioned carcass codes. For the bead apexes 5, there is preferably used a two-component apex comprising a stiffener 5S made of hard rubber having a JIS A hardness of 75 to 90 degrees and a buffer 5B of soft rubber having JIS A hardness of 45 to 65 degrees. As a matter of course, there can be used a single-component apex made of hard rubber. The upper edge thereof extends to the range of 20 to 60% of the cross-sectional height of the tire, and provided with functions to reinforce the beads and the sidewalls and to increase the lateral and vertical spring coefficients of the tire.

In this embodiment, a further reinforcing layer 9, which extends toward the sidewall beyond the bead reinforcing layer 7, is disposed outside each bead reinforcing layer 7.

As mentioned above, in the present invention, the steel radial tire is provided with the carcass cord reinforcing layers of bias arrangement which are disposed adjacent to the outside of the radially arranged carcass from the beads to both edges of the belt layer, whereby the lateral and vertical spring coefficients of the tire increase more than the conventional steel tire. Accordingly, unstable states due to the rolling and the pitching are greatly prevented, and at the same time, a damping performance to the vibration of the mast of forklifts, and vibration of the top of high location working vehicles, such as truck cranes and the likes is effectively improved.

BEST MODE OF CARRYING OUT THE INVENTION

Tires of size 7.00R12 were made by way of trial in accordance with the structure shown in FIG. 1 and the specifications shown in Table 1, and tested for various tire characteristics such as rolling, damping coefficient, spring coefficient. For comparison, bias tires, steel textile tires, and steel radial tires were made in accordance with prior art and the specification shown in Table 1.

The measurements of the characteristics shown in Table 1 were performed under the conditions that the air pressure was 7.0 kgf/cm$^2$ (for bias tire) and 9.0 kgf/cm$^2$ (for radial tire).

TABLE 1

|  | Ref. 1 | Ref. 2 | Ref. 3 | Ref. 4 | Ex. 1 |
| --- | --- | --- | --- | --- | --- |
| Carcass |  |  |  |  |  |
| Structure | Bias | Radial | Radial | Radial | Radial |
| No. of ply | 6 | 4 | 1 | 1 | 1 |
| Cord material | Nylon 1260 d/2 | Nylon 1500 d/2 | Steel 7 × 4/0.175 | Steel 7 × 4/0.175 | Steel 7 × 4/0.175 |
| Cord angle (°) | 36 | 90 | 55 | 90 | 90 |
| Belt layer |  |  |  |  |  |
| No. of ply | 1 | 3 | 3 | 3 | 3 |
| Cord material | Nylon 840 d/2 | Steel 3/0.20 + 6/0.38 | Steel 3/0.20 + 6/0.38 | Steel 3/0.20 + 6/0.38 | Steel 3/0.20 + 6/0.38 |
| Cord angle (°) | 36 | 67/16/16 | 67/16/16 | 67/16/16 | 67/16/16 |
| Cord reinforcing layer |  |  |  |  |  |
| No. of ply |  |  |  | 2 | 2 |
| Cord material |  |  |  | Nylon 1260 d/2 | Nylon 1260 d/2 |
| Cord angle (to the radial direction) |  |  |  | 70° | 70° |
| Overlap (Belt layer) |  |  |  | 0 | 20 mm |
| Overlap (Bead reinforcing layer) |  |  |  | 0 | 30 mm |
| Bead apex |  |  | hard/soft two-compo. | hard/soft two-compo. | hard/soft two-compo. |
| JIS A hardness (°) | 86 | 86 | 86/60 | 86/60 | 86/60 |
| No. of rollings to convergence*[1] | 8.7 | 9.2 | 10.5 | 10.3 | 9.5 |
| Convergence time (sec)*[1] | 9.9 | 10.4 | 12.3 | 12.0 | 10.7 |
| Damping coefficient*[1] | 100 | 96 | 74 | 81 | 100 |
| Feeling test*[2] | 4+ | 3+ | 3− | 2− | 4+ |
| Vertical spring coefficient (kgf/mm) | 79 | 98 | 91 | 93 | 96 |
| Lateral spring coefficient (kgf/mm) | 28 | 29 | 28 | 29 | 31 |

*[1] The number of rollings to convergence, the convergence time and the damping coefficient were measured with a accelerometer attached to the mast of a forklift when a wheel on one side run over a protrusion on a loaded condition. The damping coefficient is indicated by an index based on an assumption that the result of the reference 1 is 100, wherein the larger the value, the better the performance.

*[2] In the feeling test, ride comfort upon actual running was evaluated by a feeling five point method. The larger the value, the better the performance. The point less than 3 means a unsatisfactory result.

We claim:
1. A radial tire for high load which possesses an excellent vibration-damping performance, which comprises:

a bead portion, sidewall portion and tread portion;
a bead core disposed in each bead portion of the tire;
a carcass, having at least one ply of steel cords laid radially at an angle of 80 to 90 degrees to the circumferential direction of the tire, extending from the bead portions through the sidewall portions and through the tread portion of the tire, said carcass being folded back at its ends around the bead cores to form two carcass folded portions;
a belt layer having at least one ply of steel cords extending outside of a crown of the carcass at a small angle to the circumferential direction of the tire;
a bead reinforcing layer disposed in each bead portion and extending along the carcass around the bead core;
a bead apex, disposed between the carcass and the carcass folded portion in each bead portion adjacent to the carcass, and extending from an upper side of the bead core toward the sidewall portion so that an upper edge of the bead apex extends in a range of 20 to 60% of the cross-section height of the tire,
each of the sidewall portions provided with an inner carcass cord reinforcing layer and an outer carcass cord reinforcing layer which sandwich the carcass therebetween along their radial width, each of said inner and outer carcass cord reinforcing layers being composed of at least one ply of fiber cords arranged at a bias with respect to the radial direction of the tire so as to cross the steel cords of the carcass,
said outer carcass cord reinforcing layer disposed adjacent to and axially outside of the carcass and extending from the belt edge and to the bead portion so that a radially outer edge portion thereof is held between the carcass and the belt layer, and a radially inner edge portion thereof overlaps with the bead reinforcing layer, and terminates at a position above the bead core,
said inner carcass cord reinforcing layer being disposed adjacent to and axially inside of the carcass and extending to the belt edge and to the bead portion so that a radially outer edge portion thereof overlaps with the belt layer, whereby said outer edge is located at a position under the belt and a radially inner edge portion thereof is held between the carcass and the bead reinforcing layer, but terminates at a portion above the bead core;
said bead apex being composed of a stiffener made of hard rubber having a JIS (A) hardness of 75 to 90 and a buffer made of soft rubber having a JIS (A) hardness of 45 to 65,
said stiffener extending taperingly from the upper side of the bead core toward the sidewall portion, and
said buffer extending from an upper edge of said stiffener to the sidewall portion along the outer carcass cord reinforcing layer.

2. The tire as set forth in claim 1, wherein the fiber cords of the carcass cord reinforcing layer are laid at a bias angle between 30 and 90 degrees to the radial direction of the tire.

* * * * *